United States Patent

[11] 3,572,726

| [72] | Inventor | Harry Simister Bottoms<br>Olton, Solihull, England |
|---|---|---|
| [21] | Appl. No. | 730,147 |
| [22] | Filed | May 17, 1968 |
| [45] | Patented | Mar. 30, 1971 |
| [73] | Assignee | Joseph Lucas (Industries) Limited<br>Birmingham, England |

[54] SHAFT SEALS
1 Claim, 2 Drawing Figs.

[52] U.S. Cl. ................................................ 277/74,
277/75, 277/88, 277/91
[51] Int. Cl. ........................................... F16j 15/16
[50] Field of Search .................................... 277/74, 75,
91, 65, 82, 67, 88, 134, 96, 83

[56] References Cited
UNITED STATES PATENTS

| 846,237 | 3/1907 | Nolan | 277/74X |
|---|---|---|---|
| 2,188,784 | 1/1940 | Grothouse | 277/75 |
| 2,338,873 | 1/1944 | Reynolds | 277/82 |
| 2,606,779 | 8/1952 | Jagger | 277/134 |
| 3,119,623 | 1/1964 | Shevchenko | 277/27X |
| 3,236,529 | 2/1966 | Heim | 277/67X |

*Primary Examiner*—Samuel B. Rothberg
*Attorney*—Holman, Glascock, Downing and Seebold

ABSTRACT: A shaft seal between a shaft and a structure comprising a sealing member with an axially presented surface carried on a bellows on the shaft or structure and an axially presented surface on the structure or shaft against which the sealing member engages, and the sealing member having a radially presented annular surface engaging with a complementary surface on the part having the other axially presented surface.

PATENTED MAR 30 1971 3,572,726

INVENTOR
H. S. Bottoms
BY Blenock, Downing
& Seebold.
ATTORNEYS

SHAFT SEALS

This invention relates to seals of the kind for sealing between a shaft and surrounding structure with respect to which there is relative rotation in use, in which either the shaft or the structure has an axially presented annular surface, the other part carrying a flexible sealing member such as a bellows to which is secured a sealing ring provided with a complementary axially presented annular surface.

The object of the invention is to provide a shaft seal of the kind specified in a convenient form.

In accordance with the present invention a shaft seal of the kind specified is characterized in that the sealing ring is provided with a radially presented annular surface engageable with a complementary radially presented surface on the shaft or structure with respect to which relative rotation takes place, in use.

Figure 1:
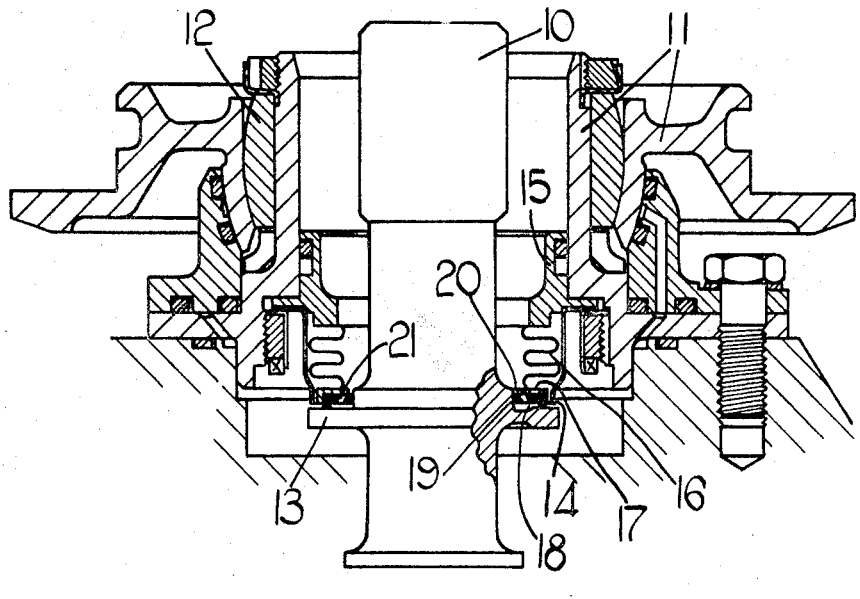
Figure 2:
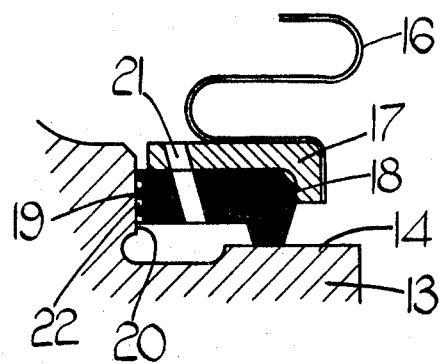

An example of the invention will now be described with reference to the accompanying drawings in which:

FIG. 1 is a cross-sectional view of a shaft assembly incorporating a seal constructed in accordance with the invention; and FIG. 2 is an enlarged fragmentary view of the seal.

In the example shown, a shaft 10 is mounted in a surrounding relatively fixed structure 11 which incorporates a bearing assembly indicated generally at 12 permitting relatively small changes in alignment between the shaft 10 and the fixed structure 11 without rotation. The journal bearing supporting the shaft 10 itself is not, however, illustrated, but there is provided between the shaft 10 and the fixed structure 11 a sealing arrangement which forms the subject of this invention.

For sealing purposes, the shaft 10 is provided with an annular flange 13 which provides an axially presented annular surface 14.

Carried by the fixed structure 11 is a member 15 to which is attached one end of a bellows 16. At the opposite end of the bellows 16 is secured a supporting ring 17 for a carbon or other sealing ring 18 which is provided with an axially presented annular surface engageable with the annular complementary surface 14 on the flange 13 of the shaft 10. The bellows 16 acts as a spring to urge the sealing ring 18 towards the flange 13, and also permits small relative movement between the shaft and the fixed structure 11 to take place without disturbing the seal. Such an arrangement thus far described is substantially conventional, but in accordance with this invention, the sealing ring 18 has a radially inwardly presented annular surface 19 which engages against a complementary surface 20 on the shaft 10 to form a journal bearing.

In order that the sealing surfaces and also the journal bearing surfaces 19 and 20 shall be lubricated, the surface 19 of the sealing ring 18 is provided with a helical groove 22 or other formation providing a suitable entry path through which the lubricant flows to the space between these surfaces, as relative rotation between the sealing ring 18 and the shaft 10 takes place. In order that such lubricant can, however, escape, there are drillings 21 extending through the member 17 and the sealing ring 18. The drillings 21 are inclined to the axis of rotation so that centrifugal force provides a larger pressure at one end of each drilling than obtains at the other. The flow is, however, small.

In an alternative arrangement, the sealing ring 18 has a radially outwardly presented annular surface engageable with a complementary radially inwardly presented surface formed on a suitable part of the shaft 10 or on a part secured thereto, and suitable drillings and other passages are provided for the entry and escape of lubricant. The lubricant is provided by one of the fluids at opposite sides of the seal.

I claim:

1. A shaft seal for sealing between a shaft and a surrounding structure between which, in use, relative rotation takes place, comprising a sealing ring having an axially presented surface engageable with a corresponding axially presented surface on the shaft, and a flexible bellows connected between the sealing ring and the structure, the sealing ring having a radially presented annular surface engageable with a complementary radially presented surface on the shaft, the sealing ring having an entry path for lubricant formed as a helical groove in the radially presented surface and the sealing ring also having an escape path for lubricant formed therein.